July 6, 1943.   E. M. BERTRAN   2,323,367
AIRPLANE LANDING GEAR
Filed June 10, 1941   2 Sheets-Sheet 1
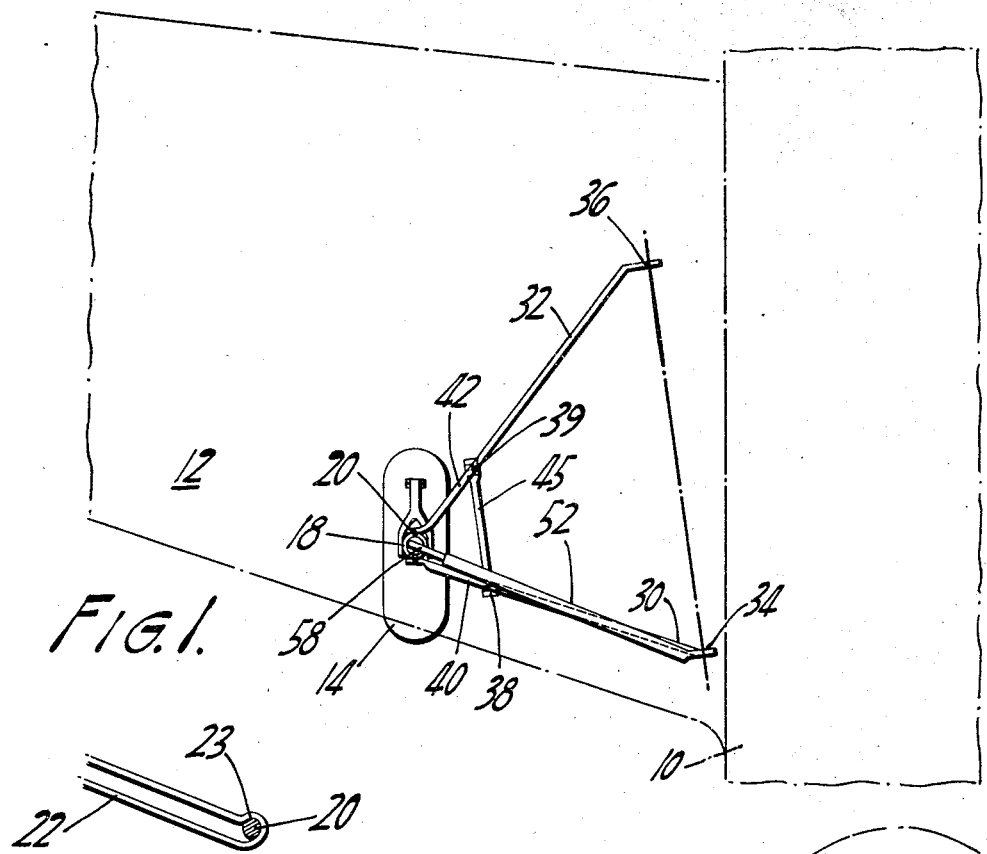
Fig. 1.
Fig. 3.
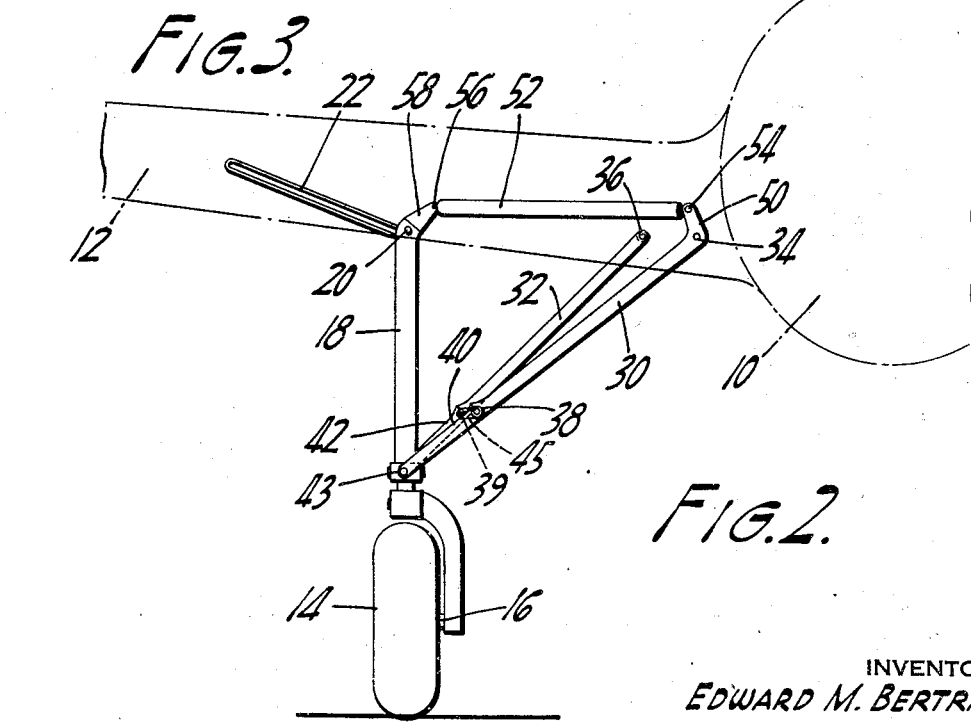
Fig. 2.
INVENTOR
EDWARD M. BERTRAN
BY
Beau, Brooks, Buckley & Beau.
ATTORNEYS July 6, 1943.  E. M. BERTRAN  2,323,367
AIRPLANE LANDING GEAR
Filed June 10, 1941  2 Sheets-Sheet 2

INVENTOR
EDWARD M. BERTRAN
BY
Beau, Brooks, Buckley & Beau.
ATTORNEYS

Patented July 6, 1943

2,323,367

UNITED STATES PATENT OFFICE 2,323,367

AIRPLANE LANDING GEAR

Edward M. Bertran, Jackson Heights, N. Y., assignor to Brewster Aeronautical Corporation, Long Island City, N. Y.

Application June 10, 1941, Serial No. 397,429

2 Claims. (Cl. 244—102)

This invention relates to aircraft and more particularly to retractable landing gear devices therefor.

One of the objects of the invention is to provide an improved airplane undercarriage which is completely retractable within the wing panels of the airplane in an improved manner. Another object of the invention is to provide an airplane undercarriage of the above description which is of improved ruggedness and simplicity of construction. Another object of the invention is to provide an improved landing gear of the character described which is adapted to support the airplane when grounded in an improved mannner. Other objects and advantages of the invention will appear from the specification hereinafter.

In the drawings:

Fig. 1 is a fragmentary plan of an airplane showing an undercarriage unit of the invention, in its extended position;

Fig. 2 is a fragmentary front elevation corresponding to Fig. 1;

Fig. 3 is a fragmentary view, on an enlarged scale, of a detail of Fig. 2;

Figure 4:
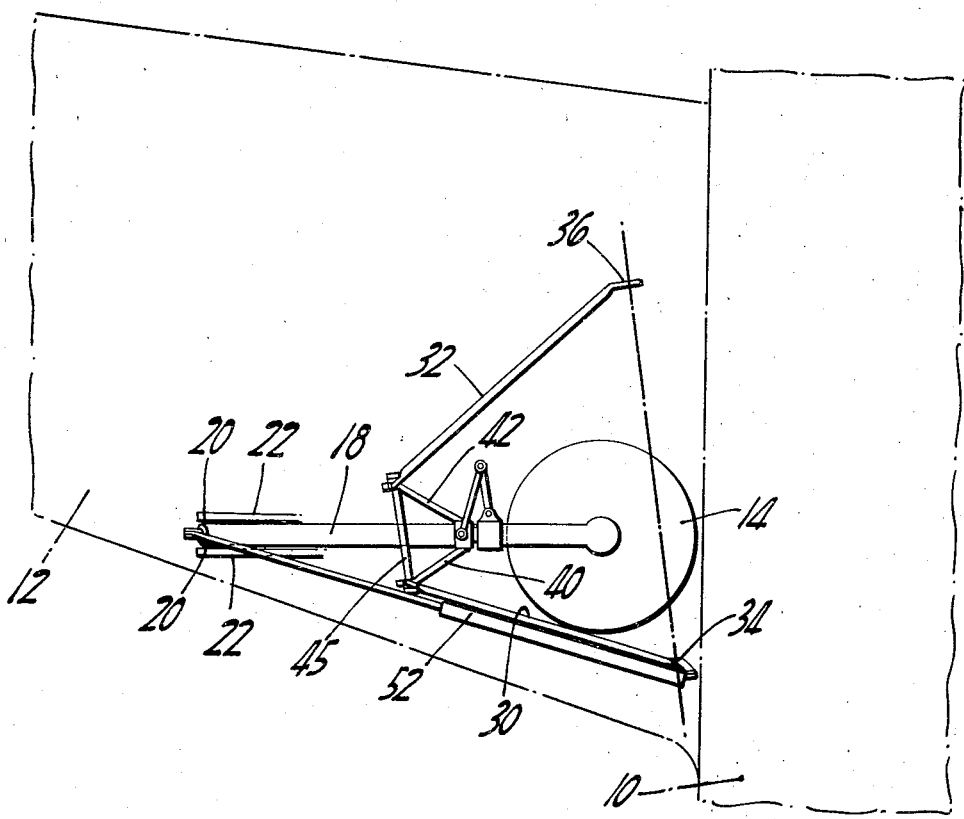
Fig. 4 is a view similar to that of Fig. 1, but showing the landing gear in retracted position within the adjacent wing panel structure.

The drawings illustrate the invention in connection with an airplane illustrated fragmentarily as including a fuselage portion 10 and a wing panel 12 extending laterally therefrom. A landing wheel 14 and its retractable supporting gear unit is illustrated as being mounted upon the wing panel 12 to provide one half of a dual-wheel landing gear for the airplane; it being understood that a similar unit will be provided in conjunction with the opposite wing panel to complete the under carriage for the forward end of the airplane. It will also be understood that the mechanisms for effecting extension-retraction movements of the opposite gear units will be preferably so arranged as to procure simultaneous movements thereof in response to pilot manipulation of a single control device in accord with usual practice; but in the interest of simplifying the present specification and avoiding unnecessary duplication of description of the mechanism and the operation thereof, the drawings and detailed description herein are limited to relate to only one of the undercarriage units.

The landing wheel 14 is rotatably carried by a bearing shaft 16 extending from the lower end of a shock absorbing main strut 18 which is arranged to be disposed substantially vertically when the gear is in extended position, as illustrated in Figs. 1 and 2. Opposite bosses 20 extend forwardly and rearwardly from the upper end of the strut 18 into sliding engagement within corresponding track devices 22 which are arranged in parallel relation and rigidly mounted upon structural elements of the wing panel 12. The tracks 22 are provided with dwell portions 23 (Fig. 3) adapted to engage the bosses 20 when the gear is in extended position, in such manner as to resist accidental displacement of the bosses from gear-extended position. The tracks 22 extend laterally from the positions of the dwells toward the wing tip for guiding movements of the upper end portion of the strut 18 during retraction of the gear, as will be explained hereinafter.

The strut 18 is braced adjacent its lower end by means of a pair of diverging brace struts 30—32 which pivotally connect at their upper ends by means of aligned bearings 34—36, respectively, to structural elements of the wing panel 12. At their lower ends the brace struts 30—32 connect through means of "knuckle" joints 38—39, respectively, with the base portion of an A-frame truss defined by struts 40—42—45 which is hinged at 43 to the strut 18 and projects therefrom in plan-view diverging relation and in plan-view alignment with the brace struts 30—32. The hinge axes of the knuckle points 38—39 are arranged to align in parallelism with the line of the axes of the pivotal connections 34—36 between the bracing struts 30—32 and the wing panel structure.

Figure 5:
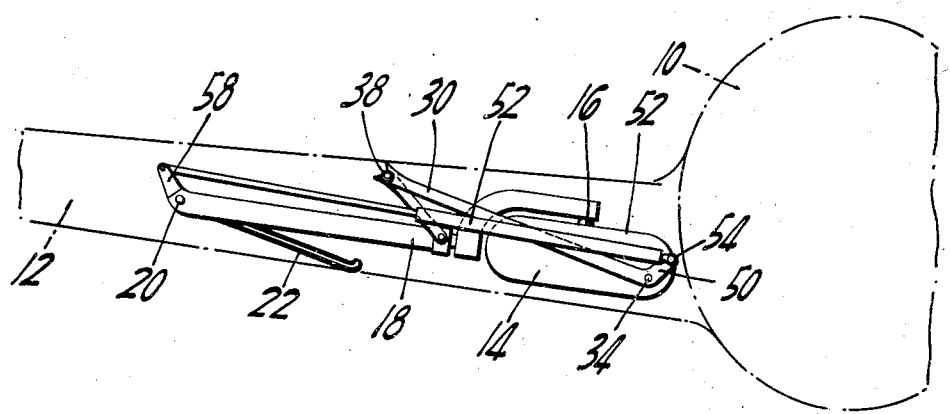
Fig. 5 is a fragmentary front elevation corresponding to Fig. 4.

A crank arm 50 (Fig. 2) is provided to extend rigidly from the upper end portion of the brace strut 30 beyond the axis of the pivotal connection 34 thereof; and an expansion-contraction strut 52, which may be in the form of a hydraulic jack, is pivotally connected at one of its ends to the crank 50, as at 54. The strut 52 is pivotally connected at its other end, as at 56, to a crank portion 58 which extends upwardly from the wheel strut 18 above the position of the bosses 20—20. Thus, it will be understood that upon extension of the strut 52 from the condition thereof illustrated in Figs. 1 and 2, as by introduction of fluid under pressure into the cylinder of the strut 52, pressure forces will be exerted against the crank devices 50—58 in such manner as to cause the upper end of the strut 18 to be moved toward the outer tip end of the wing panel, while the brace strut 30 will be simultaneously caused to pivot about the axis of its connection 34 to the wing panel. Thus, while the upper end portion of the wheel strut 18 is being guided by the tracks 22 to move upwardly within the wing panel and outwardly toward the wing tip end thereof, the lower end portion of the wheel strut is being drawn by the pivotal movement of the brace strut 30 to move upwardly toward confinement within the wing panel contour, as to the position thereof illustrated in Figs. 4 and 5. Upon reverse application of fluid pressure within the jack strut 52 the gear will unfold from the position of Figs. 4 and 5 and return to the position of Figs. 1–3, with some assistance by the forces of gravity.

Thus, it will be understood that the gear of the invention comprises essentially a pair of converging brace struts (30—32) which are based at relatively widely separated points upon the wing panel in close proximity to the airplane fuselage where the wing panel framing structure is strongest, and a main strut (18) which extends vertically from the region of pivotal connection with the lower converging end portions of the brace struts into vertically abutting connection with the track elements (22). The expansion-contraction strut connects between lever arm portions extending from the upper ends of the main strut and one of the brace struts. Thus, the hydraulic jack mechanism is at all times completely enclosed within the wing contour and has one of its ends disposed at all times in close proximity to the fuselage of the airplane, whereby the hydraulic pressure conveying conduit devices leading from the fuselage are relatively short and close coupled. Consequently, when in extended position, the landing wheel 14 is supported by means of a pyramidal truss having three widely spaced points of connection to the wind structure; and yet upon retraction of the gear the brace struts (30—32) fold so as to permit the rigid main strut to be disposed completely within the wing contour without requiring provision of an undue amount of space for the retracted gear within the wing panel.

Although only one form of the invention has been shown and described in detail, it will be apparent to those skilled in the art that the invention is not so limited but that various changes may be made therein without departing from the spirit of the invention or the scope of the appended claims.

I claim:

1. In an aircraft, a retractable undercarriage comprising a rigid main strut, landing surface contact means mounted upon one end portion of said main strut, slide-pivot connection means carried by said main strut adjacent its opposite end portion, track means mounted upon a fixed portion of said aircraft in registry with said connection means and extending in substantially horizontal directions whereby said main strut is adapted to simultaneously slide and pivot at said opposite end portion thereof relative to said track means for swinging said strut and landing surface contact means into retracted position relative to said aircraft, a pair of diagonally disposed knuckle struts pivotally connected at corresponding end portions thereof to said support strut at positions thereon offset from the position of said slide-pivot connection means and extending therefrom in diverging relation into pivotal connections at their corresponding opposite ends with fixed portions of said aircraft, a crank extending from one of said knuckle struts, a second crank extending from said main strut, a beam extending between said knuckle struts at similar sides of the axis of breaking thereof to synchronize their knuckle actions, and jack means extending between said cranks for simultaneous actuation thereof.

2. In an aircraft, a retractable undercarriage including a main support strut adapted to extend vertically below said aircraft when in undercarriage-extended condition, a pair of brace struts pivotally connected to said main strut so as to extend therefrom into pivotal connections with fixed portions of said airplane at widely spaced positions thereon, said brace struts being hinged intermediately of their ends and adapted to fold for retraction of said gear, a crank arm extending from the inner end of said main strut, slide and pivot connection means disposed intermediately of the ends of said main strut and connecting the latter to said aircraft, motor means coupled to said crank arm for driving the latter to rotate said main strut upon said connection means and coupled to one of said brace struts so as to simultaneously actuate the latter about its hinge, and slope synchronizing means extending between said brace struts to synchronize the hinging operations thereof.

EDWARD M. BERTRAN.